(12) United States Patent
Miller

(10) Patent No.: US 6,629,793 B1
(45) Date of Patent: Oct. 7, 2003

(54) EMOTICON KEYBOARD

(75) Inventor: Steve Miller, Parkland, FL (US)

(73) Assignee: Westie Intellectual Properties Limited Partnership, Boca Raton, FL (US)

(*) Notice: Subject to any disclaimer, the term of this patent is extended or adjusted under 35 U.S.C. 154(b) by 0 days.

(21) Appl. No.: 10/133,052

(22) Filed: Apr. 26, 2002

(51) Int. Cl.⁷ .................................................. B41J 5/28
(52) U.S. Cl. ........................ 400/472; 400/489; 400/103
(58) Field of Search ............................... 400/472, 103, 400/489; 455/466

(56) References Cited

U.S. PATENT DOCUMENTS

| | | | |
|---|---|---|---|
| 3,235,055 A | 2/1966 | Pagenkopf | |
| 3,927,752 A | 12/1975 | Jones et al. | |
| 4,795,349 A | 1/1989 | Sprague et al. | |
| 4,940,346 A | 7/1990 | Liljenquist | |
| 5,358,343 A | 10/1994 | Klauber | |
| 5,667,319 A | 9/1997 | Satloff | |
| 6,011,495 A * | 1/2000 | Chen ........................... | 341/22 |
| 2002/0077135 A1 * | 6/2002 | Hyon .......................... | 455/466 |
| 2002/0164189 A1 * | 11/2002 | Glassover ................... | 400/477 |

FOREIGN PATENT DOCUMENTS

| | | | |
|---|---|---|---|
| DE | 004100174 A1 | 9/1991 | |
| DE | 19648802 A1 * | 5/1998 | ........... G06F/3/023 |

OTHER PUBLICATIONS

USPTO Official Translation of DE 19,648,802, translated May 20, 2003.*
AOL Instant Messenger AIM Home Page, URL: http://www.aim.com/index.adp.

* cited by examiner

*Primary Examiner*—Charles H. Nolan, Jr.
(74) *Attorney, Agent, or Firm*—Jon A. Gibbons; Fleit, Kain, Gibbons, Gutman & Bongini P.L.

(57) ABSTRACT

A keyboard system for generating emoticons and abbreviations, the system includes a keyboard including keys representing emoticons and keys representing abbreviations. The system further includes a keyboard processor in the keyboard, wherein the keyboard processor produces enhanced scan codes when keys representing emoticons and keys representing abbreviations are pressed in the keyboard. The system further includes a keyboard driver on a computer system for interfacing with the keyboard, wherein the keyboard driver receives the enhanced scan codes and determines the emoticons or abbreviations corresponding to the enhanced scan codes. Lastly, the system includes an application, such as an instant messaging application, a word processor or an email application, on the computer system for interfacing with the keyboard driver. The application receives the emoticons or abbreviations determined by the keyboard driver and displays an image corresponding to the emoticons or abbreviations.

31 Claims, 13 Drawing Sheets

EMOTICON KEYBOARD

BACKGROUND OF THE INVENTION

1. Field of the Invention

This invention generally relates to the field of computer keyboards and more specifically to emoticon and abbreviation keys for computer keyboards.

2. Description of Related Art

Like the telegraph and the telephone, the Internet has changed the way people communicate. With the advent of email, cell phones, voice over IP and teleconferencing, people are able to immediately communicate at virtually any time and in almost any place. As a result, vast amounts of information are hurled back and forth over the Internet every second of every day. Instant messaging, in particular, has enjoyed increasing success. One popular instant messaging application, America Online (AOL) Instant Messenger, boasts 140 million registered users. Instant messaging, also known as chatting, allows users to instantly exchange text, graphic, audio and video messages.

Because instant messaging applications are typically used to exchange text messages, users have engaged their imagination to supplement the instant messaging experience. One product of the increasing popularity of instant messaging is the creation of abbreviations and emoticons. An abbreviation is a shortened set of alphanumeric characters that represent a longer phrase or set of words. The purpose of an abbreviation is to save time when typing a message. For example, one popular abbreviation is "AWK," which stands for "away from keyboard." Another abbreviation is "HRU," which stands for "How are you?" The term emoticon comes from the phrase "emotion icon" and comprises a symbol used to convey an emotion, a state of mind or any other concept. Emoticons are often used to convey a thought without using words. An emoticon can be a text emoticon, such as the smiley face: ) or it can be a graphic emoticon.

One problem with instant messaging is that the user must type all text information that is exchanged. This can be tedious and time consuming. Although the use of emoticons and abbreviations shorten the number of keys that must be pressed to convey a concept, the user must still press a certain number of keys to convey the shortened abbreviation or emoticon. Take, for example, the "AWK" abbreviation. This seemingly short abbreviation requires the pressing of six keys to type: Shift-A-Shift-W-Shift-K. Accordingly, there exists a need to further shorten the number of key presses necessary to convey an abbreviation or emoticon.

Another problem with current instant messaging environments is that the user is confined to the keys on his keyboard. With the myriad of abbreviations, text emoticons and graphic emoticons available, the user must choose from a finite and rather small set of keys to produce one of many symbols. This results in the user having to press more than one key or using a graphical menu to choose an abbreviation or emoticon for display. This can be confusing and distracting to the instant messaging experience. Accordingly, there exists a need to provide additional keys to the user.

Yet another problem with current instant messaging environments is that abbreviations and emoticons, like language, fluctuate in an out of vogue. As a result, when an emoticon or abbreviation is provided in a permanent manner such as in a menu item, the usability of the application program may decrease as emoticons and abbreviations eventually become obsolete. Accordingly, there exists a need for user-definable abbreviations and emoticons.

Therefore, a need exists to overcome the problems with the prior art as discussed above, and particularly for a way to efficiently generate emoticons and abbreviations while instant messaging.

SUMMARY OF THE INVENTION

Briefly, in accordance with the present invention, disclosed is a keyboard for generating emoticons and abbreviations. In an embodiment of the present invention, the system includes a keyboard including keys representing emoticons and keys representing abbreviations. The system further includes a keyboard processor in the keyboard, wherein the keyboard processor produces enhanced scan codes when keys representing emoticons and keys representing abbreviations are pressed in the keyboard. The system further includes a keyboard driver on a computer system for interfacing with the keyboard, wherein the keyboard driver receives the enhanced scan codes and determines the emoticons or abbreviations corresponding to the enhanced scan codes. Lastly, the system includes an application, such as an instant messaging application, a word processor or an email application, on the computer system for interfacing with the keyboard driver. The application receives the emoticons or abbreviations determined by the keyboard driver and displays an image corresponding to the emoticons or abbreviations.

In an embodiment of the present invention, the system includes a keyboard attachment including keys representing emoticons and keys representing abbreviations, wherein the keyboard attachment is coupled to a keyboard. The system further includes a keyboard processor in the keyboard attachment, wherein the keyboard processor produces enhanced scan codes when keys representing emoticons and keys representing abbreviations are pressed in the keyboard attachment. The system further includes a keyboard driver on a computer system for interfacing with the keyboard attachment, wherein the keyboard driver receives the enhanced scan codes and determines the emoticons or abbreviations corresponding to the enhanced scan codes. Lastly, the system includes an application on the computer system for interfacing with the keyboard driver, wherein the application receives the emoticons or abbreviations determined by the keyboard driver and displays an image corresponding to the emoticons or abbreviations.

The described embodiments of the present invention are advantageous as they allow for the quick and easy generation of emoticons and abbreviations during execution of an application. This results in a more pleasurable and less time-consuming experience while using the application. Another advantage of the present invention is the availability of additional keys on a keyboard. This provides more key options for the user during execution of the application and saves time and resources. Yet another advantage of the present invention is the easy installation of the keyboard. This results in increased usability and user-friendliness of the keyboard.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

DESCRIPTION OF THE PREFERRED EMBODIMENTS

Overview

Figure 1:
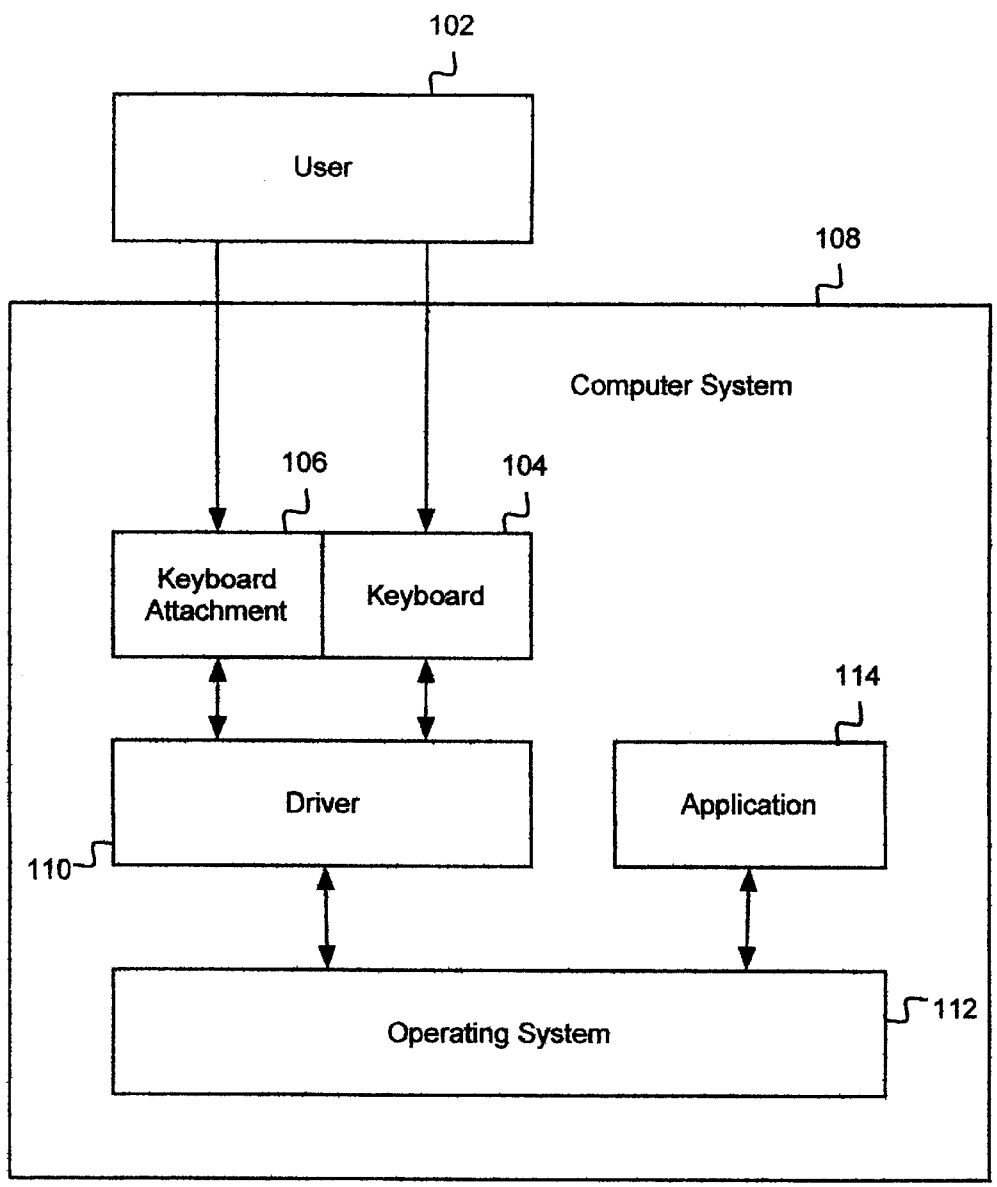
FIG. 1 is a block diagram illustrating the overall system architecture of a conventional system for interfacing a keyboard with an application.

FIG. 1 is a block diagram illustrating the overall system architecture of a conventional system for interfacing a keyboard with an application. The system of the present invention adheres to the overall system architecture of such a conventional system. A user 102 utilizes a keyboard 104 of a client computer system 108 to interact with an application 114 executing on the client computer system 108. The client computer system 108 includes a keyboard 104, a keyboard driver 110 for managing keyboard 104 and an operating system 112. As user 102 presses keys on keyboard 104, the processor in keyboard 104 sends corresponding scan codes to the driver 110, which maps the scan code to characters and sends the characters to the operating system 112. Operating system 112 then processes the characters and relays them to application 114. These processes are described in greater detail below.

Figure 2:
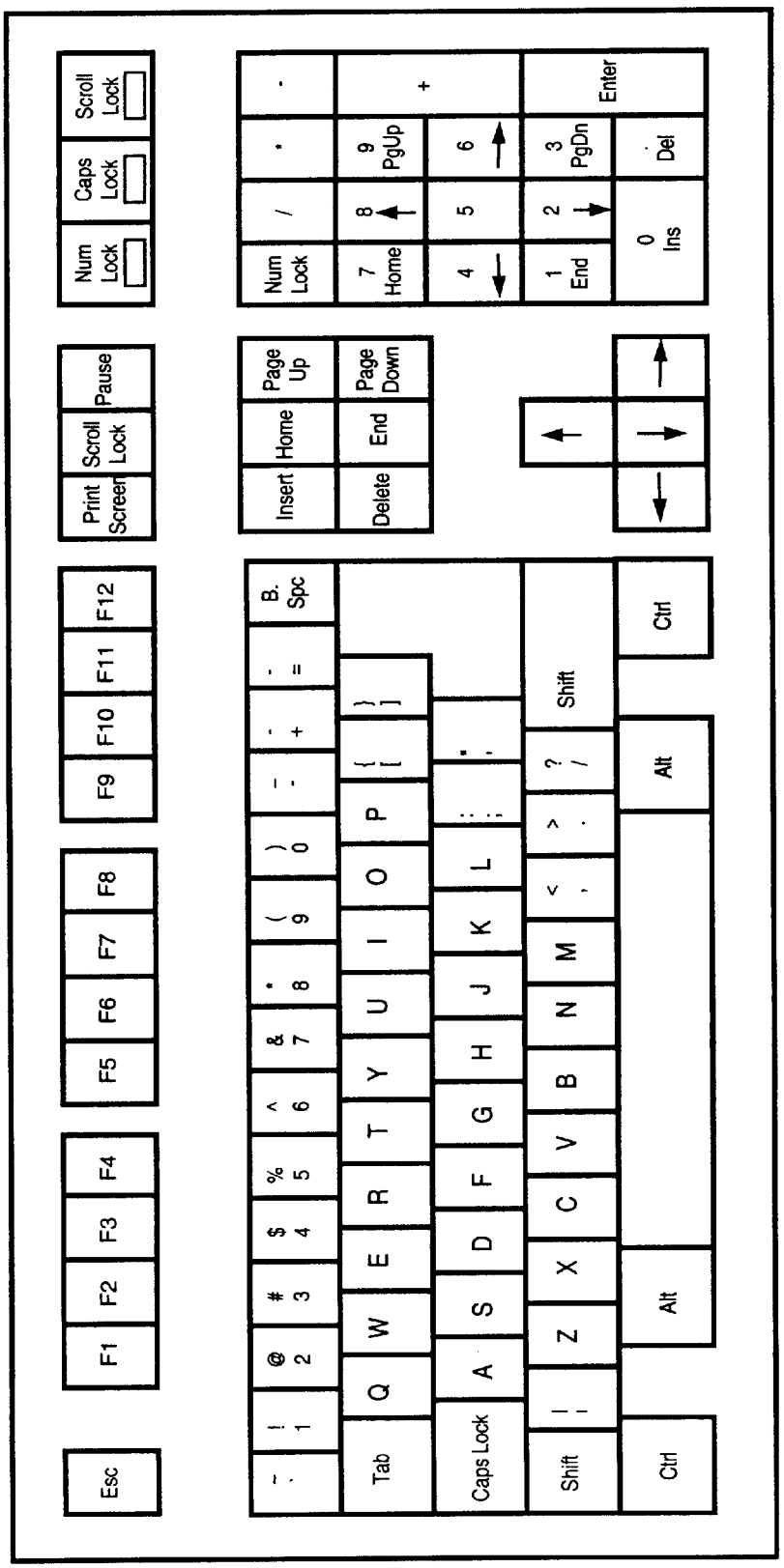
FIG. 2 is an illustration of a standard 108-key keyboard.

In an embodiment of the present invention, keyboard 104 is a 108-key Apple keyboard, a standard 104-key Windows keyboard, a 102-key U.K keyboard, a 101-key enhanced keyboard or any other commercially available keyboard. Keyboard 104 is equipped with a PS/2 connector, a Universal Serial Bus (USB) connector, a serial connector, or any other connector for coupling a peripheral to the client computer system 108. As an example of keyboard 104, FIG. 2 is an illustration of a standard 108-key keyboard.

Figure 3:
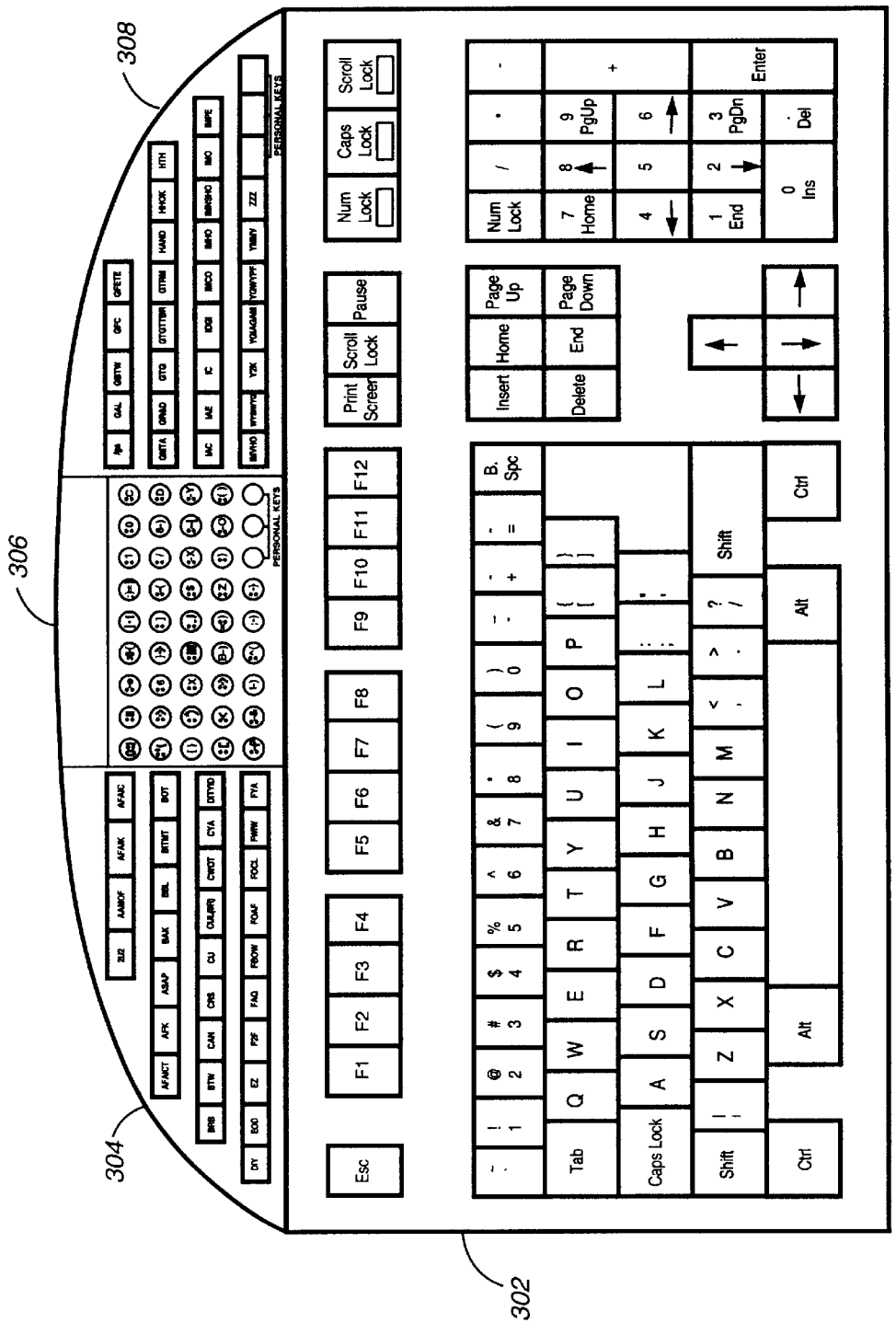
FIG. 3 is an illustration of a keyboard including keys for emoticons and abbreviations, in an embodiment of the present invention.

In another embodiment of the present invention, keyboard 104 includes all of the components of the commercially available keyboards described in the previous embodiment. In this embodiment, keyboard 104 also includes additional keys representing emoticons and abbreviations. The additional keys are used during the execution of an application 114, described below, in order to facilitate interaction with application 114. As an example, FIG. 3 is an illustration of a keyboard including keys for emoticons and abbreviations. FIG. 3 shows a component 302 of keyboard 104, which corresponds to the standard 108-key keyboard of FIG. 2. FIG. 3 also shows component 306 of keyboard 104, which includes keys representing emoticons. Lastly, FIG. 3 shows component 304 and component 308 of keyboard 104, which include keys representing abbreviations.

Figure 4:
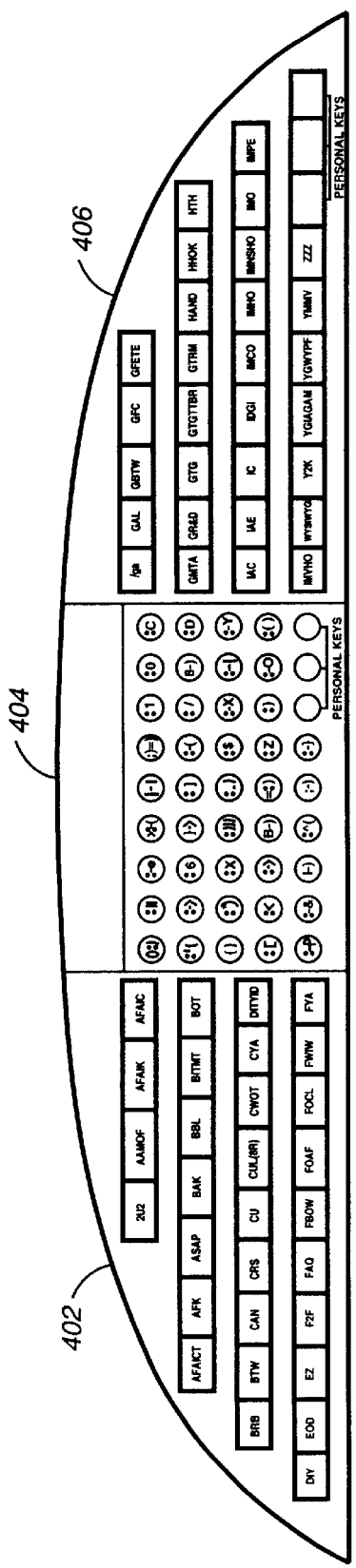
FIG. 4 is an illustration of a keyboard attachment including keys for emoticons and abbreviations, in an embodiment of the present invention.

Returning to FIG. 1, in an embodiment of the present invention, a keyboard attachment 106 is attached to keyboard 104 for the purpose of providing additional keys to the user 102. As in the previous embodiment, the additional keys represent emoticons and abbreviations. Keyboard attachment 106 is equipped with a PS/2 connector, USB connector, serial connector or any other connector for coupling peripherals. Keyboard attachment 106 is coupled to the keyboard 104 using the available connector. Alternatively, keyboard attachment 106 is connected to computer system 108. Keyboard attachment 106 utilizes a resident processor to interpret key presses on the keyboard attachment 106 and generate the corresponding scan codes. Alternatively, the keyboard attachment 106 utilizes a processor on keyboard 104 to interpret key presses on the keyboard attachment 106. In this alternative, keyboard attachment 106 must be coupled directly to keyboard 104. As an example, FIG. 4 is an illustration of a keyboard attachment including keys for emoticons and abbreviations. FIG. 4 shows component 404 of keyboard 104, which includes keys representing emoticons. In addition, FIG. 4 shows component 402 and component 406 of keyboard 104, which include keys representing abbreviations.

Figure 6:
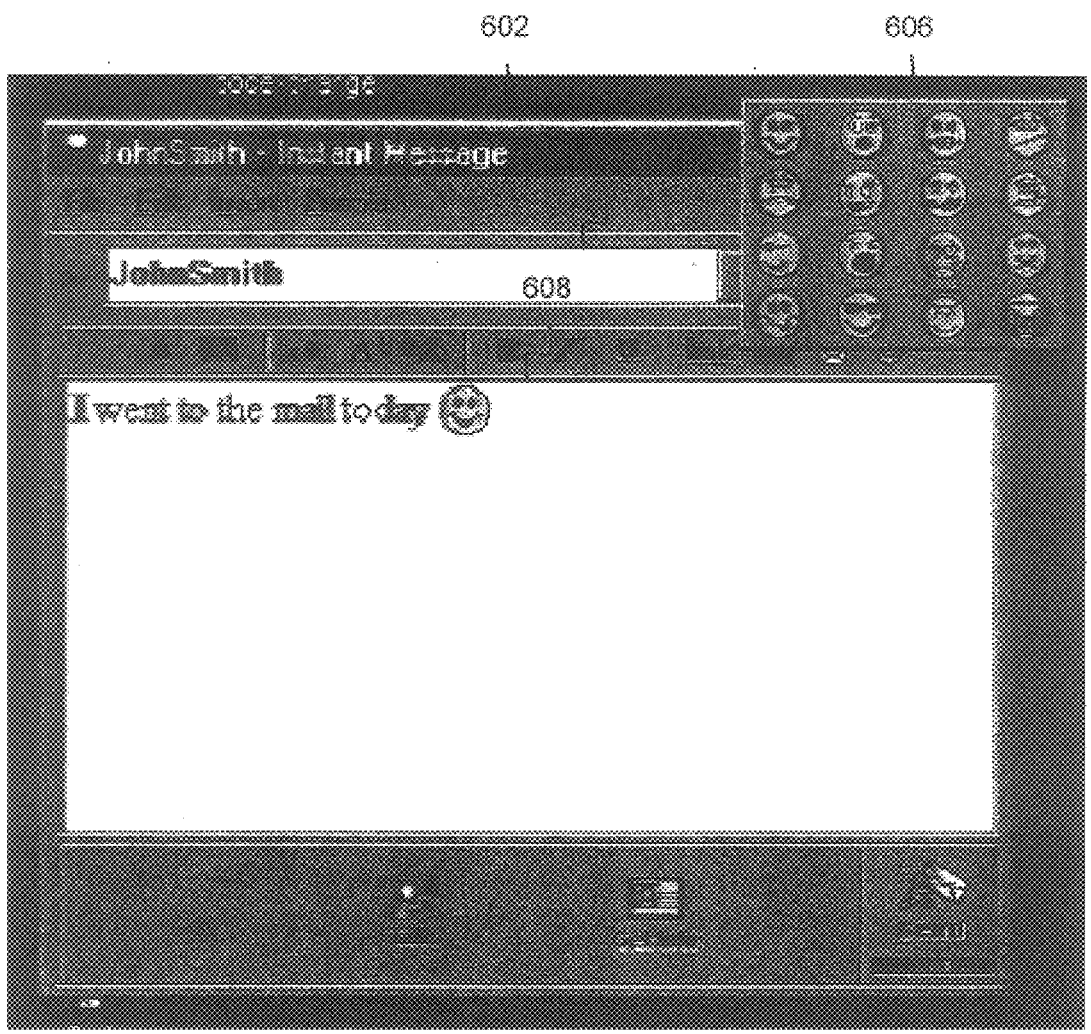
FIG. 6 is a screenshot of a popular instant messaging application.

Referring to FIG. 1, in an embodiment of the present invention, application 114 is a commercially available instant messaging application, word processing application or email application. Examples of a commercially available instant messaging application are America Online (AOL) Instant Messenger, Microsoft Network (MSN) Messenger, Yahoo! Messenger, ICQ and Proteus. As an example, FIG. 6 is a screenshot of a popular instant messaging application. Examples of a commercially available word processing application are Microsoft Word, Corel WordPerfect, Lotus WordPro, Adobe Acrobat and Apple's AppleWorks. Examples of a commercially available email application are Microsoft Outlook, Microsoft Entourage, Lotus Notes, Apple Mail and Qualcomm's Eudora.

In an embodiment of the present invention, the computer system 108 is a desktop computer, a laptop computer, a Personal Digital Assistant (PDA), a palmtop computer, a game console or any other computer processing device. The computer system 108 comprises the IBM platform, the Apple platform, the SGI platform, the Sun platform or an other commercially available computer platform. In addition, the computer system 108 executes the Microsoft Windows 95/98/2000/ME/CE/NT/XP operating system, the Mac OS operating system, the UNIX operating system, the LINUX operating system, the AIX operating system or any other commercially available operating system. The computer system 108 is described in greater detail below.

The Keyboard/Application Interface

Figure 5:
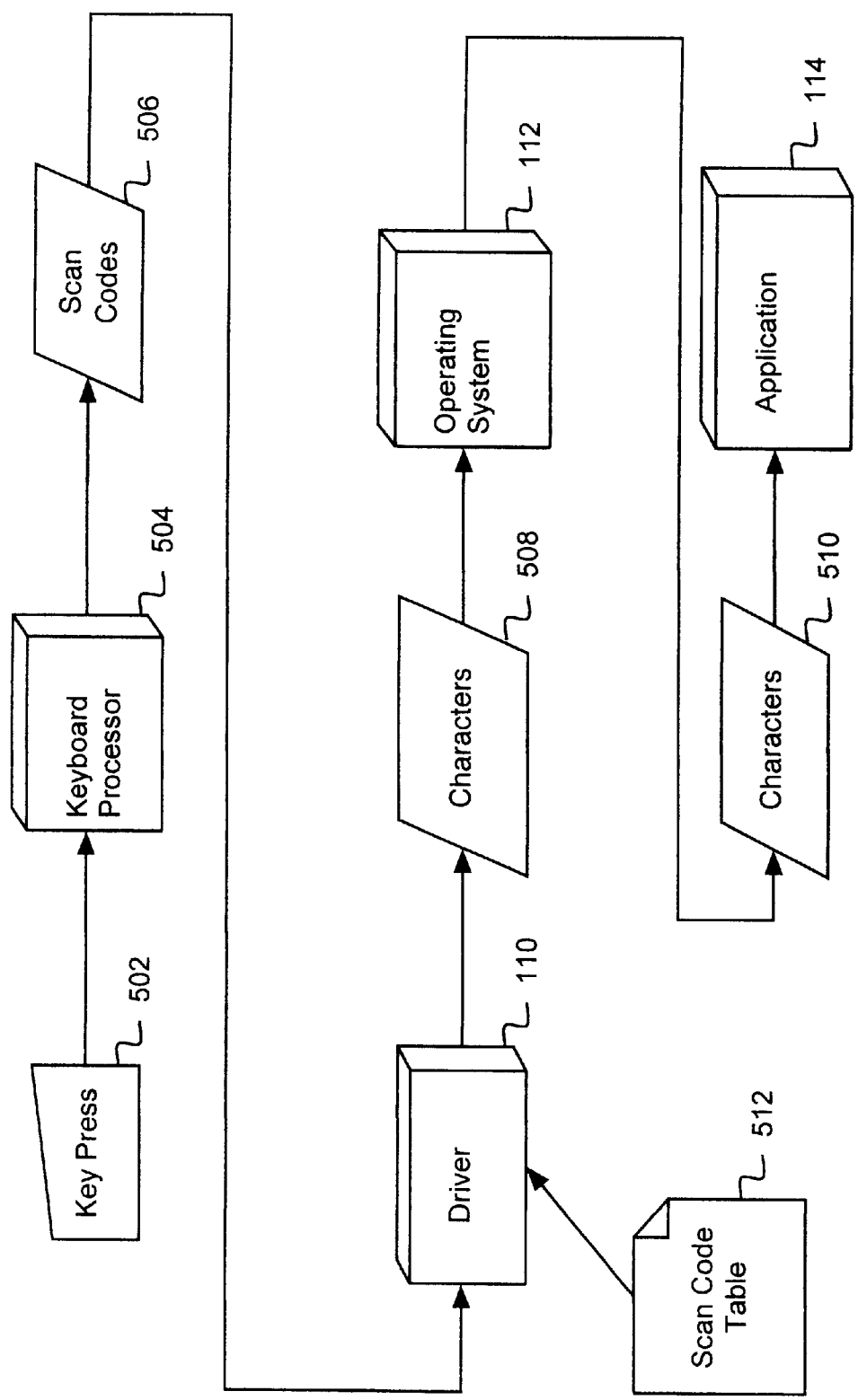
FIG. 5 is a functional diagram illustrating the conventional process of interfacing a keyboard with an application.

FIG. 5 is a functional diagram illustrating the conventional process of interfacing a keyboard with an application.

The system of the present invention adheres to the conventional process shown in FIG. 5. FIG. 5 shows a key press 502 representing an event wherein user 102 presses one or more keys on the keyboard 104 or keyboard attachment 106. The key press event 502 is captured by a keyboard processor 504 located within keyboard 104 or keyboard attachment 106. The keyboard processor 504 is programmed to convert key press events, such as key press 502, into information that can be processed by computer system 108. The keyboard processor 504 converts key press 202 into a scan code or scan codes 506. A scan code is a numerical representation of a key in a keyboard. When a user 102 presses a key in keyboard 104 or keyboard attachment 106, keyboard processor 504 captures the key press event 502, converts the key press 502 into a scan code or scan codes 506 and sends the scan code or scan codes 506 to the keyboard driver 110 in computer system 108.

For each key on keyboard 104 or keyboard attachment 106, there are two scan codes—a make scan code and a break scan code. A make scan code indicates that a particular key has been pressed in keyboard 104 or keyboard attachment 106. A break scan code indicates that a particular key has been released in keyboard 104 or keyboard attachment 106. Using make scan codes and break scan codes, keyboard processor 504 continually sends updates to computer system 108 regarding activity on keyboard 104 or keyboard attachment 106.

As an example, the tables below show commonly known make scan codes and break scan codes for keys in commercially available keyboards. Table 1 shows the scan codes for alphanumeric and punctuation keys. For each key in Table 1, the regular character is provided, as well as the character that is produced when the Shift key is pressed or the Caps Lock key is toggled on. Table 2 shows the scan codes for modification keys. Table 3 shows the scan codes for cursor control and navigation keys. Table 4 shows the scan codes for keys in the numeric keypad. For each key in Table 4, the regular character is provided, as well as the character that is produced when the NumLock key is toggled on. Table 5 shows the scan codes for function keys. Table 6 shows the scan codes for special keys. For each key in Table 6, the regular command is provided, as well as the alternate command.

TABLE 1

ALPHANUMERIC AND PUNCTUATION KEYS

| Regular Character | Shifted Character | Make Code | Break Code |
|---|---|---|---|
| (backwards quote) | ~ | 29 | A9 |
| 1 | ! | 02 | 82 |
| 2 | @ | 03 | 83 |
| 3 | # | 04 | 84 |
| 4 | $ | 05 | 85 |
| 5 | % | 06 | 86 |
| 6 | ^ | 07 | 87 |
| 7 | & | 08 | 88 |
| 8 | * | 09 | 89 |
| 9 | ( | 0A | 8A |
| 0 | ) | 0B | 8B |
| - | _ | 0C | 8C |
| = | + | 0D | 8D |
| <Tab> | <BackwardsTab> | 0F | 8F |
| q | Q | 10 | 90 |
| w | W | 11 | 91 |
| e | E | 12 | 92 |
| r | R | 13 | 93 |

TABLE 1-continued

ALPHANUMERIC AND PUNCTUATION KEYS

| Regular Character | Shifted Character | Make Code | Break Code |
|---|---|---|---|
| t | T | 14 | 94 |
| y | Y | 15 | 95 |
| u | U | 16 | 96 |
| i | I | 17 | 97 |
| o | O | 18 | 98 |
| p | P | 19 | 99 |
| [ | { | 1A | 9A |
| ] | } | 1B | 9B |
| \ | | | 2B | AB |
| a | A | 1E | 9E |
| s | S | 1F | 9F |
| d | D | 20 | A0 |
| f | F | 21 | A1 |
| g | G | 22 | A2 |
| h | H | 23 | A3 |
| j | J | 24 | A4 |
| k | K | 25 | A5 |
| l | L | 26 | A6 |
| ; | : | 27 | A7 |
| (regular quote) | (double quote) | 28 | A8 |
| # | ~ | 2B | AB |
| <Enter> |  | 1C | 9C |
| \ | | | 56 | D6 |
| z | Z | 2C | AC |
| x | X | 2D | AD |
| c | C | 2E | AE |
| v | V | 2F | AF |
| b | B | 30 | B0 |
| n | N | 31 | B1 |
| m | M | 32 | B2 |
| , | < | 33 | B3 |
| (comma) |  |  |  |
| . | > | 34 | B4 |
| (period) |  |  |  |
| \ | ? | 35 | B5 |
| <Space Bar> |  | 39 | B9 |

TABLE 2

MODIFICATION KEYS

| Character | Make Code | Break Code |
|---|---|---|
| <Caps Lock> | 3A | BA |
| <Left Shift> | 2A | AA |
| <Right Shift> | 36 | B6 |
| <Left Ctrl> | 1D | 9D |
| <Left Alt> | 38 | B8 |
| <Right Alt> | E0 38 | E0 B8 |
| <Right Ctrl> | E0 1D | E0 9D |
| <Num Lock> | 45 | C5 |
| <Scroll Lock> | 46 | C6 |

TABLE 3

CURSOR CONTROL AND NAVIGATION KEYS

| Character | Make Code | Break Code |
|---|---|---|
| <Backspace> | 0E | 8E |
| <Insert> | E0 52 | E0 D2 |
| <Delete> | E0 53 | E0 D3 |
| <Left Arrow> | E0 4B | E0 CB |
| <Home> | E0 47 | E0 C7 |
| <End> | E0 4F | E0 CF |
| <Up Arrow> | E0 48 | E0 C8 |
| <Down Arrow> | E0 50 | E0 D0 |
| <Page Up> | E0 49 | E0 C9 |

TABLE 3-continued

CURSOR CONTROL AND NAVIGATION KEYS

| Character | Make Code | Break Code |
|---|---|---|
| <Page Down> | E0 51 | E0 D1 |
| <Right Arrow> | E0 4D | E0 8D |

TABLE 4

NUMERIC KEYPAD

| Regular Character | "NumLocked" Character | Make Code | Break Code |
|---|---|---|---|
| <Home> | 7 | 47 | C7 |
| <Left Arrow> | 4 | 4B | CB |
| <End> | 1 | 4F | 8F |
| \ | | E0 35 | E0 B5 |
| <UpArrow> | 8 | 48 | C8 |
| (none) | 5 | 4C | CC |
| <Down Arrow> | 2 | 50 | D0 |
| <Ins> | 0 | 52 | D2 |
| * | | 37 | B7 |
| <PgUp> | 9 | 49 | C9 |
| <Right Arrow> | 6 | 4D | CD |
| <PgDn> | 3 | 51 | D1 |
| <Del> | (period) | 53 | D3 |
| − | | 4A | CA |
| + | | 4E | CE |
| <Enter> | | E0 1C | E0 9C |

TABLE 5

FUNCTION KEYS

| Character | Make Code | Break Code |
|---|---|---|
| <F1> | 3B | BB |
| <F2> | 3C | BC |
| <F3> | 3D | BD |
| <F4> | 3E | BE |
| <F5> | 3F | BF |
| <F6> | 40 | C0 |
| <F7> | 41 | C1 |
| <F8> | 42 | C2 |
| <F9> | 43 | C3 |
| <F10> | 44 | C4 |
| <F11> | 57 | D7 |
| <F12> | 58 | D8 |

TABLE 6

SPECIAL KEYS

| Key # | Regular Command | Alternate Command | Make Code | Break Code |
|---|---|---|---|---|
| 110 | <Esc> | | 01 | 81 |
| 124 | <Print Screen> | <System Request> | E0 2A<br>E0 37 | E0 B7<br>E0 AA |
| 126 | <Pause> | <Break> | E1 1D 45<br>E1 9D C5 | (none) |

Referring back to FIG. 5, the keyboard driver 110 receives the scan code or scan codes 506 received from keyboard processor 504. Subsequently, the driver 110 uses a scan code table 512 to determine the character that corresponds to each scan code 506. The scan code table 512 is similar to Tables 1–6 above. That is, the scan code table 512 shows the correspondence between scan codes and characters. Thus, the driver 110 generates a character or characters 508 corresponding to the scan code or scan codes 506.

Next, the operating system 112 of computer system 108 receives and processes the character or characters 508. Typically, an operating system 112 processes characters provided by a driver, such as driver 110, or an application, such as application 114, for the purpose of determining whether the provided characters indicate an operating system command. If the provided characters indicate an operating system command, the operating system 112 performs or processes the command. If the provided characters do not indicate an operating system command, the operating system 112 relays the provided characters to the current dominant application.

For example, if the user of an IBM personal computer running the Microsoft Windows 95 operating system and executing a word processor presses the key sequence Ctrl-Alt-Del, then the operating system captures the key sequence and proceeds to reboot the personal computer. However, if the user presses the key "1," then the operating system captures the key press and proceeds to relay the corresponding characters to the current dominant application—the word processor. The word processor then proceeds to display the number "1" in the current document.

Referring back to FIG. 5, the operating system 112 relays the characters 508, now characters 510, to the application 114 if the character or characters 508 do not indicate an operating system command. Application 114 proceeds to process the characters 510. The characters 510 are then used to input text or graphics into an application 114 display. This is described in greater detail below.

FIG. 6 is a screenshot of a popular instant messaging application. FIG. 6 shows a Graphical User Interface (GUI) 602 for an instant messaging application 114. GUI 602 includes a text field 604 for indicating the second party with which the current instant messaging session is taking place. GUI 602 also includes a display 608 for displaying the content of the current instant messaging session. As the user 102 enters information for communication to the second party, the entered information is displayed in display 608. Likewise, as the second party sends information to the user 102, the information received by application 114 is displayed in display 608. Display 608 shows some text that has been entered by user 102 for communication to the second party.

Lastly, GUI 602 includes an emoticon pull-down menu 606 for choosing a graphic emoticon from a list of available graphic emoticons. The user 102 is provided the option to choose a graphic emoticon from pull-down menu 606 during an instant messaging session in order to convey an emotion, state of mind or any other concept conveyed by a graphic emoticon. Display 608 shows a graphic emoticon that has been entered by user 102 for communication to the second party.

It should be noted that as the user 102 engages in the instant messaging session, the GUI 602 becomes the dominant window. That is, the GUI 602 becomes the main point of entry for data entered by user 102. Thus, as the user 102 enters data using, for example a keyboard 104, the entered data is channeled to the GUI 602. Specifically, as the user 102 enters and receives text and graphics from the display 608 during an instant messaging session, the display 608 of GUI 602 becomes the main point of entry for data entered by user 102.

Figure 7:
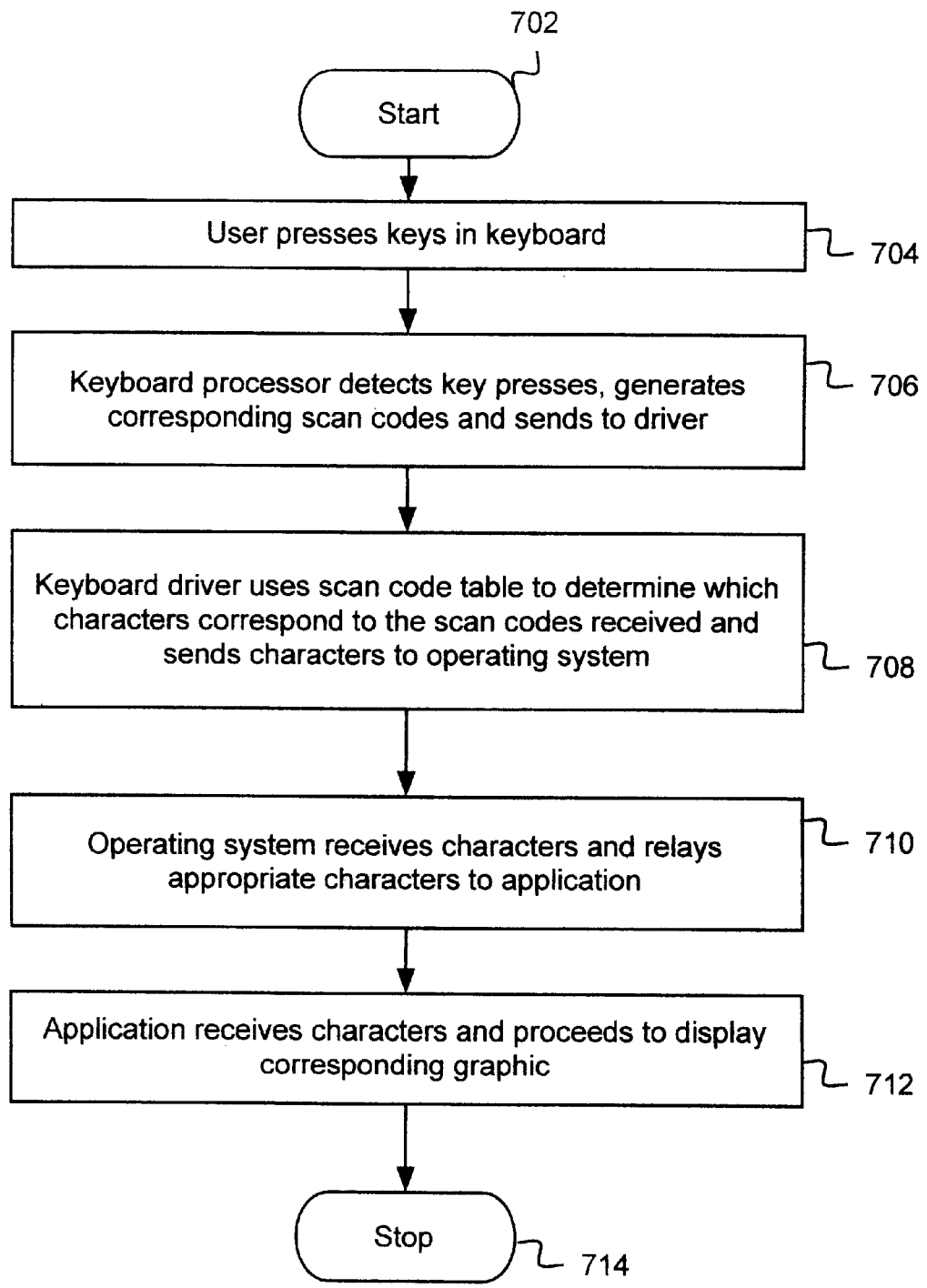
FIG. 7 is a flowchart depicting the operation and control flow of the conventional process of interfacing a keyboard with an application.

FIG. 7 is a flowchart depicting the operation and control flow of the conventional process of interfacing a keyboard with an application. The system of the present invention adheres to the conventional process shown in FIG. 7. The control flow of FIG. 7 begins with step 702 and flows directly to step 704. In step 704, a user 102 presses a key in keyboard 104 or keyboard attachment 106, producing a key press event 502. In step 706, the keyboard processor 504 captures the key press 502 and generates a corresponding scan code or scan codes 506. Subsequently, the keyboard processor 504 sends the scan code or scan codes 506 to the keyboard driver 110 in the computer system 108 of user 102.

Next, in step 708, the keyboard driver 110 receives the scan code or scan codes 506 and uses a scan code table 512 to determine which character or characters correspond to the scan code or scan codes 506. Then, the keyboard driver 110 sends the character or characters 508 corresponding to the scan code or scan codes 506 to the operating system 112.

In step 710, the operating system 112 receives the character or characters 508 from keyboard driver 110 and determines whether the character or characters 508 indicate an operating system command. If the character or characters 508 indicate an operating system command, the operating system 112 performs or processes the indicated command. If the character or characters 508 do not indicate an operating system command, the operating system 112 relays the character or characters 508, now character or characters 510, to the dominant application in the operating system 112, i.e., application 114.

In step 712, the application 114 receives the character or characters 710 from the operating system 112 and proceeds to display the text or graphics indicated by character or characters 710 in a window in application 114. This process is described in greater detail above. In step 714, the control flow of FIG. 7 ceases.

Emoticons and Abbreviations

As explained above, the popularity of instant messaging has spawned the creation of emoticons and abbreviations. The term "emoticon" stands for "emotion icon" and refers to a symbol used to represent an emotion. As users engage in instant messaging they sometimes desire to include an emoticon to convey an emotion, a state of mind or other concept. One of the earliest emoticons was the smiling face represented by the characters: ) comprising only text. Another early emoticon was the frowning face represented by the characters: (comprising only text. Emoticons, however, have grown to represent any symbol used to represent a graphic concept. An emoticon can be a set of text characters, such as the smiling and frowning faces shown above. An emoticon can also be a graphic such as the emoticon faces shown in section the pull-down menu 606 of FIG. 6 below. As an example, Table 7 below shows a commonly known list of text emoticons.

TABLE 7

TEXT EMOTICONS

| | | | |
|---|---|---|---|
| ;-) | Humor | :Q | Smoking II |
| :-):-) | Masks; theatrical | :~j | Smoking/smiling |
| :<) | Hairy lips | :/i | No smoking |
| :) | Smile | :-l | It's something |
| :( | Frown | :* | Kiss |
| :<)= | Beards, too | :-x | Kiss, kiss |
| :\) | Not funny | :-> | Another happy face |
| '-) | Wink | :-( | Unhappy |
| P-) | Pirate | :-c | Really unhappy |
| ;-) | Wink II | :-C) | Unbelieving |

TABLE 7-continued

TEXT EMOTICONS

| | | | |
|---|---|---|---|
| (@@) | You're kidding! | :-< | Forlorn |
| :-" | Pursing lips | :-B | Drooling |
| :-v | Another face | :-\| | Disgusted |
| :-V | Another face | :\ | Cry |
| :-w | Forked tongue | :D | Laugh |
| :-W | Shout | %-) | Confuse |
| :-r | Bleahhh! | :-? | Licking your lips |
| :-f | Bleahhh! | <:>== | A turkey |
| :-p | Bleahhh! | :-):-):-) | A loud guffaw |
| :-1 | Smirk | :-J | Tongue-in-cheek |
| :-, | Smirk II | :*) | Clowning around |
| <:-O! | Eeek | :-8 | Talking |
| :-* | Oops! (covering mouth) | (:-) | Bicycle helmets |
| | | @= | About nuclear war |
| :x | I'm not talking | <:-) | Dumb questions |
| :-T | A straight face | o= | A burning candle |
| :-D | Said with a smile | -= | A doused candle |
| :-P | Said with a smile | OO | Headlights |
| :-y | Said with a smile | :_) | I used to be a boxer |
| :-o | More shouting | B-) | Batman |
| :-O | Still more shouting | B-\| | Keaton's Batman |
| :-{ | Count Dracula | #:-) | Matted hair |
| =\|:-)= | Uncle Sam | :-o | "Oh, nooooo!" |
| 7:) | Reagan | #:-o | Mr. Bill |
| :-# | Censored | \|-( | Late night |
| :~i | Smoking | :- ) | Noses |
| :-{#} | Braces | \|*( | Handshake offered |
| (:-$ | Braces | \|*) | Handshake |
| (:-& | Angry | <&&> | Rubber chickens |
| :- | Angry II | ><>< | Argyle socks |
| (:-( | Very sad | 2B\| 2B | Shakespeare |
| (: ( | Broken nose | (-_-) | Smile |
| (:<) | Blabber mouth | <{:-)} | Message in a bottle |
| :-(=) | Big teeth | <:-)<< | a space rocket |
| &:-) | Curly hair | (:- . . . | Heartbreaking |
| @:-) | Wavy hair | <<<<(:-) | A hat salesperson |
| ?-( | Black eye | (O_< | A fishy message |
| *:* | Fuzzy things | (:>-< | A thief: hands up! |
| *:** | Moustaches | <\|==\|) | On four wheels |
| %-) | Broken glasses | : { | Another moustache |
| +<:=\| | Monk/nun | {' | Alfred Hitchcock |
| (O-) | Cyclops | @>--->--- | A rose |
| (:-\|K- | Formal message | | |
| @%&$%& | Swear word | | |

An abbreviation is any shortened set of characters used to represent a more lengthy phrase or set of words. As users engage in instant messaging they often use abbreviations or acronyms to save time and expedite communication. One of the earliest abbreviations was LOL, which stands for "laughing out loud. " Another early abbreviation was AFK, which stands for "away from keyboard. " In an example, Table 8 below shows a list of commonly known abbreviations.

TABLE 8

ABBREVIATIONS

| | | | |
|---|---|---|---|
| AAR | At any rate | EOD | End of day |
| AAS | Alive and smiling | EOM | End of message |
| ADN | Any day now | F2F | Face to face |
| AEAP | As early as possible | FISH | First in, still here |
| AFAIK | As far as I know | FOMCL | Fell from chair laugh |
| AFK | Away from keyboard | FITB | Fill in the blank |
| AISB | As it should be | FWIW | For what it's worth |
| AOTA | All of the above | FYI | For your information |
| ASAP | As soon as possible | G2G | Got to go |
| A/S/L | Age/sex/location | G2R | Got to run |
| B4 | Before | GA | Go ahead |
| B4N | Bye for now | GAL | Get a life |
| BAK | Back at keyboard | GB | Goodbye |

TABLE 8-continued

ABBREVIATIONS

| | | | |
|---|---|---|---|
| BAU | Business as usual | GFI | Go for it |
| BBIAF | Be back in a few | GG | Gotta Go |
| BBIAM | Be back in a minute | GIAR | Give it a rest |
| BBL | Be back later | GL | Good luck |
| BC | Because | GL/HF | Good luck, have fun |
| BCNU | Be seein' you | GMTA | Grt minds think alike |
| BFN | Bye for now | GOL | Giggling out loud |
| BOL | Best of luck | GR&D | Grin, run and duck |
| BRB | Be right back | GTRM | Going to read mail |
| BTA | But then again | HAGN | Have a good night |
| BTW | By the way | HAGO | Have a good one |
| CMIIW | Correct me | HF | Have fun |
| CMON | Come one | HHIS | Head hang in shame |
| COB | Close of business | HRU | How are you? |
| CU | See you | HTH | Hope this helps |
| CUA | See you around | IAC | In any case |
| CUL | See you later | IB | I'm back |
| CUL8R | See you later | IC | I see |
| CWYL | Chat with you later | ICBW | It could be worse |
| CYA | See ya | IDK | I don't know |
| CYO | See you online | IDTS | I don't think so |
| DEGT | Don't even go there | IG2R | I got to run |
| DIKU | Do I know you? | IIRC | If I remember correct |
| DQMOT | Don't quote me | ILU | I love you |
| DTS | Don't think so | ILY | I love you |
| EMA | E-mail address | IM | Instant message |
| IMHO | In my humble opinion | OO | Over and out |
| IMNSHO | Not so humble opinion | OOTD | One of these days |
| | | OTOH | On the other hand |
| IMO | In my opinion | OTTOMH | Off the top of my head |
| INAL | I'm not a lawyer | | |
| IOW | In other words | PDQ | Pretty darn quick |
| IRMC | I rest my case | PLMK | Please let me know |
| IUSS | If you say so | PMFI | Pardon me for interrupting |
| IYKWIM | If you know what I mean | PMFJI | Pardon me for jumping in |
| IYO | In your opinion | | |
| IYSS | If you say so | POAHF | Put on a happy face |
| JAC | Just a sec | PTL | Praise the Lord |
| JIK | Just in case | PXT | Please explain that |
| JJA | Just joking around | PU | That stinks! |
| JK | Just kidding | RU | Real life |
| JMO | Just my opinion | RME | Rolling my eyes |
| KIT | Keep in touch | | |
| KOTC | Kiss on the cheek | ROTFL | Rolling on the floor laughing |
| KNIM | Know what I mean? | RSN | Real soon now |
| L8R | Later | RTFM | Read the manual |
| LD | Later, dude | SICNR | Sorry, I could not resist |
| LMAO | Laughing | | |
| LOL | Laughing out loud | SIG2R | Sorry, I got to run |
| LTM | Laugh to myself | SMHID | Scratching my head in disbelief |
| LTNS | Long time no see | | |
| MorF | Male or female? | SOMY | Sick of me yet? |
| MUSM | Miss you so much | SPST | Same place, same time |
| NBD | No big deal | | |
| NIMBY | Not in my back yard | SOTMG | Short of time, must go |
| NLT | No later than | SSDD | Same stuff, different day |
| NMH | Not much here | | |
| NOYB | None of your business | STW | Search the Web |
| | | SUITM | See you in the morning |
| NP | No problem | | |
| NRN | No response necessary | SUL | See you later |
| | | SUP | What's up? |
| NW | No way | SYL | See you later |
| OIC | Oh, I see | TAFN | That's all for now |
| OMG | Oh my God | TAM | Tomorrow a.m. |
| TC | Take care | UW | You're welcome |
| TGIF | Thank God it's Friday | WAM | Wait a minute |
| THX | Thanks | WAYF | Where are you from? |
| TIA | Thanks in advance | WB | Welcome back |
| TIAD | Tomorrow is another day | WIIFM | What's in it for me? |
| | | WTG | Way to go |

TABLE 8-continued

ABBREVIATIONS

| | | | |
|---|---|---|---|
| TLK2UL8R | Talk to you later | WTH | What the heck? |
| TMI | Too much information | WU? | What's up? |
| TMWFI | Take my word for it | WUCIWUG | What you see is what you get |
| TNSTAAFL | There's no such thing as a free lunch | WUF? | Where are you from? |
| TPM | Tomorrow p.m. | WWJD | What would Jesus do? |
| TPTB | The powers that be | | |
| TTFN | Ta ta for now | WWYC | Write when you can |
| TTTT | These things take time | WYSIWYG | What you see is what you get |
| TTYL | Talk to you later | YBS | You'll be sorry |
| TTYS | Talk to you soon | YGBKM | You gotta be kidding me |
| TU | Thank you | | |
| TY | Thank you | YMMV | Your mileage may vary |
| TYT | Take your time | | |
| TYVM | Thank you very much | YW | You're welcome |
| UGTBK | You've got to be kidding | | |

Operation of the Invention

Figure 8A:
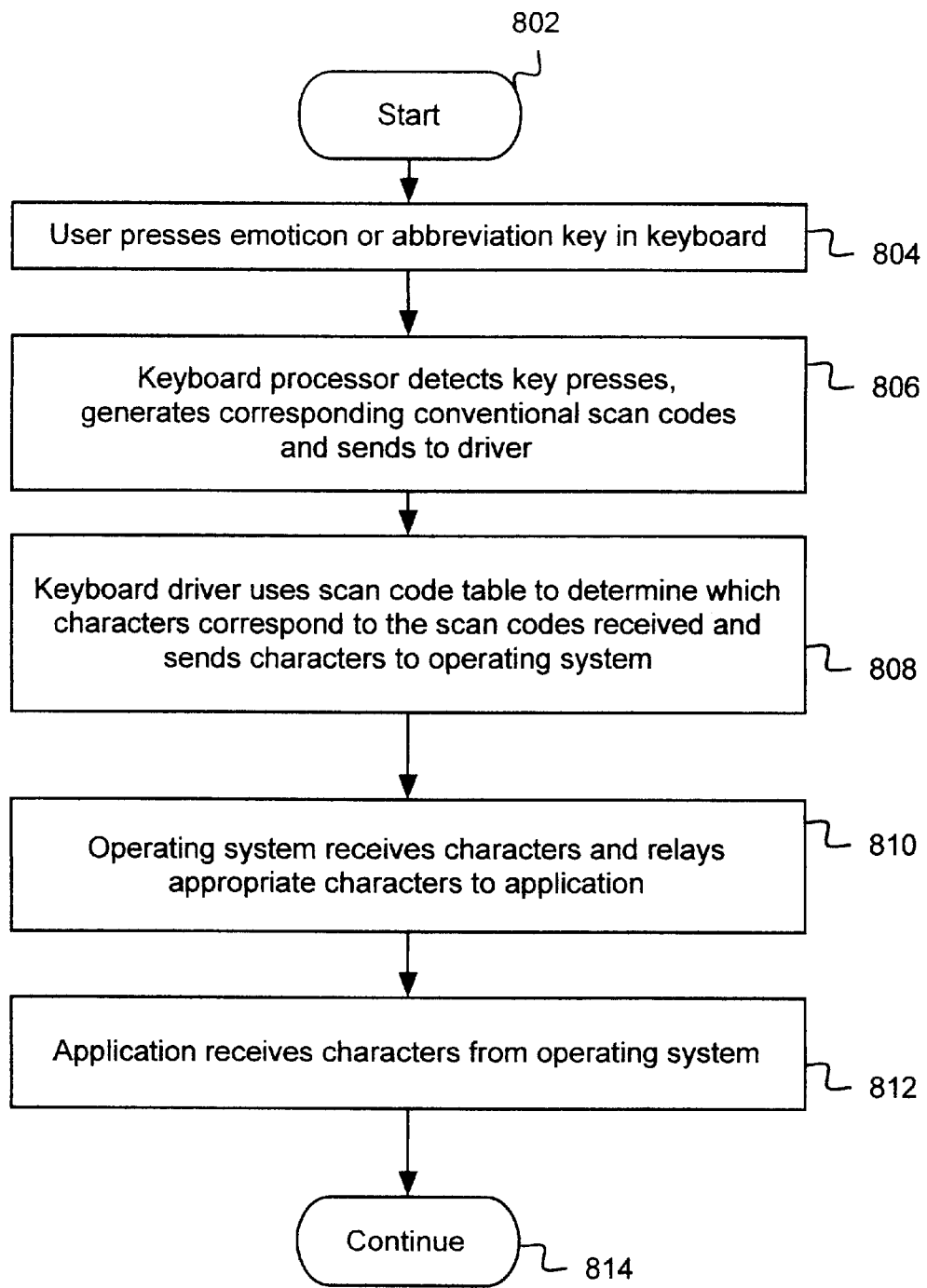
FIG. 8A is a flowchart depicting the operation and control flow of a first embodiment of the present invention.
Figure 8B:
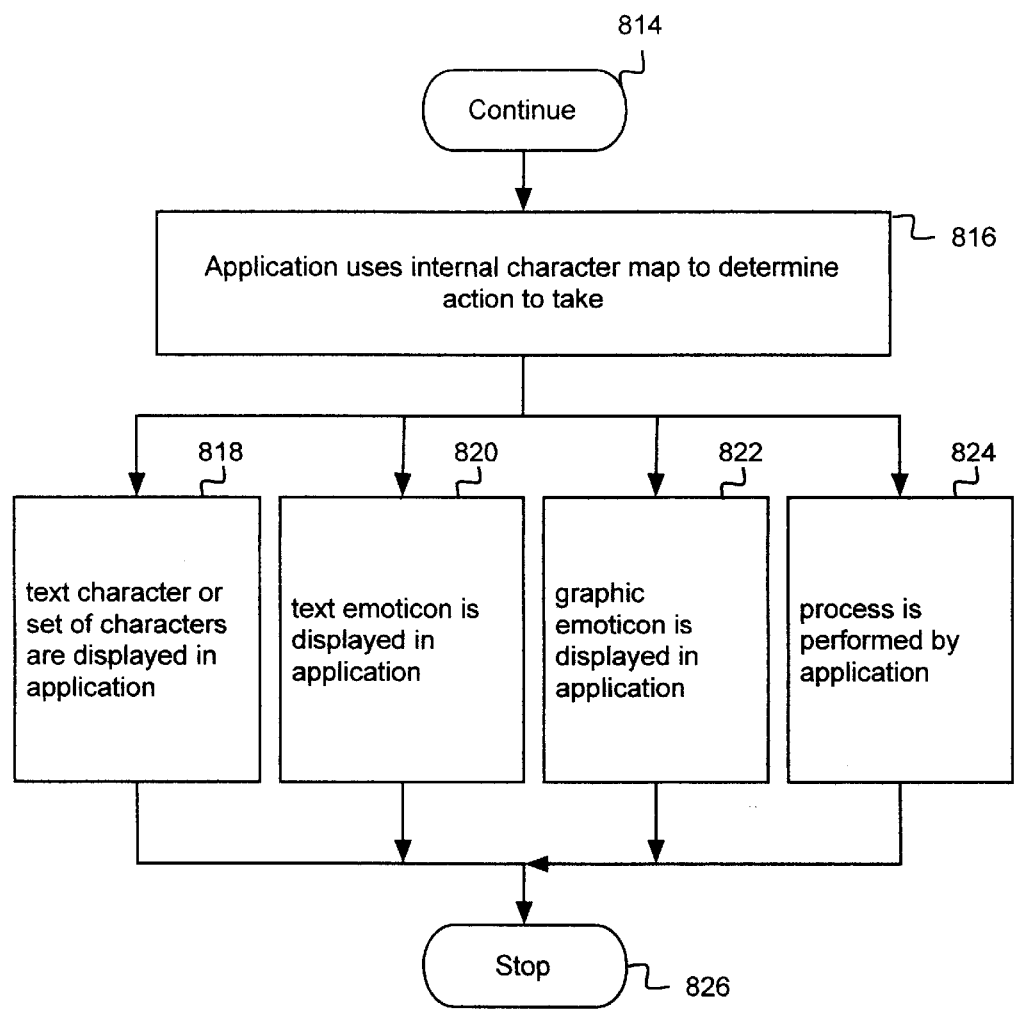
FIG. 8B is a continuation of the flowchart of FIG. 8A.

FIGS. 8A and 8B each show a flowchart depicting the operation and control flow of a first embodiment of the present invention. The control flow of FIGS. 8A and 8B begins with step 802 in FIG. 8A and flows directly to step 804. In step 804, a user 102 presses an emoticon or abbreviation key in keyboard 104 or keyboard attachment 106, producing a key press event 502. Emoticon and abbreviation keys are shown in FIGS. 3 and 4 above. In step 806, the keyboard processor 504 captures the key press 502 and generates a corresponding scan code or scan codes 506. It should be noted that the scan code or scan codes 506 generated in step 806 are conventional scan does as described in Tables 1–6 above. Subsequently, the keyboard processor 504 sends the scan code or scan codes 506 to the keyboard driver 110 in the computer system 108 of user 102.

Next, in step 808, the keyboard driver 110 receives the scan code or scan codes 506 and uses a scan code table 512 to determine which character or characters correspond to the scan code or scan codes 506. Then, the keyboard driver 110 sends the character or characters 508 corresponding to the scan code or scan codes 506 to the operating system 112.

In step 810, the operating system 112 receives the character or characters 508 from keyboard driver 110 and determines whether the character or characters 508 indicate an operating system command. Because the character or characters 508 represent an emoticon or an abbreviation, the operating system 112 determines that the character or characters 508 do not indicate an operating system command, and the operating system 112 relays the character or characters 508, now character or characters 510, to the dominant application in the operating system 112, i.e., application 114.

In step 812, the application 114 receives the character or characters 510 from the operating system 112. In step 814, the control flow of FIG. 8A flows directly to step 816 of FIG. 8B. In step 816, the application 114 uses an internal character map to determine which action to execute in response to the reception of character or characters 510. The character map of step 816 shows a correspondence between a character or characters and a resulting action.

In one embodiment of the present invention, the character map of step 816 is a table similar to Table 1 that shows a correspondence between each character or set of characters 510 and an action to be performed by application 114. In this embodiment, the table of the character map of step 816 provides a first column including a list of characters, wherein each row in the first column is populated by a character or list of characters. The table of the character map of step 816 also provides a second column including a list of actions. As an example, Table 9 below shows a portion of the table of the character map of step 816.

TABLE 9

CHARACTER MAP

| CHARACTER(S) | ACTION |
|---|---|
| a | Display "a" in the dominant display |
| b | Display "b" in the dominant display |
| c | Display "c" in the dominant display |
| Alt + 1 | Display: )text emoticon in the dominant display |
| Alt + 2 | Display: (text emoticon in the dominant display |
| Alt + 8 | Display first graphic emoticon in the dominant display |
| Alt + 9 | Display second graphic emoticon in the dominant display |
| Ctrl + O | Open a new chat window |
| Ctrl + C | Close the current chat window |

The actions represented in the second column of Table 9 are described in greater detail below.

In steps 818–824, the application 114 proceeds to execute the action corresponding to the character or characters 510 sent by operating system 112. The actions executed by application 114 include displaying a character or characters in the dominant display window in step 818, displaying a text emoticon in the dominant display window in step 820, displaying a graphic emoticon in the dominant display window in step 822 and executing a particular process in step 824. In a first example, assume that a user 102 presses the "a" key during execution of application 114. In this case, the application 114 uses the character map described in Table 9 and determines that the character "a" should be displayed in the current dominant display, such as display 608 of GUI 602 of FIG. 6. The application 114 proceeds in step 818 to display the character "a" in the dominant display.

In a second example, assume that a user 102 presses the "Alt" and "1" keys during execution of application 114. In this case, the application 114 uses the character map described in Table 9 and determines that the text emoticon: ) should be displayed in the current dominant display, such as display 608 of GUI 602 of FIG. 6. The application 114 proceeds in step 820 to display the text emoticon: ) in the dominant display.

In a third example, assume that a user 102 presses the "Alt" and "8" keys during execution of application 114. In this case, the application 114 uses the character map described in Table 9 and determines that a particular graphic emoticon, such as those shown in pull-down menu 606 of FIG. 6, should be displayed in the current dominant display, such as display 608 of GUI 602 of FIG. 6. The application 114 proceeds in step 822 to display the graphic emoticon in the dominant display.

In a fourth example, assume that a user 102 presses the "Ctrl" and "O" keys during an instant messaging session. In this case, the instant messaging application 114 uses the character map described in Table 9 and determines that a new chat window, such as GUI 602 of FIG. 6, must be opened. The application 114 proceeds in step 824 to open a new chat window.

In step 826, the control flow of FIGS. 8A and 8B ceases.

Figure 9A:
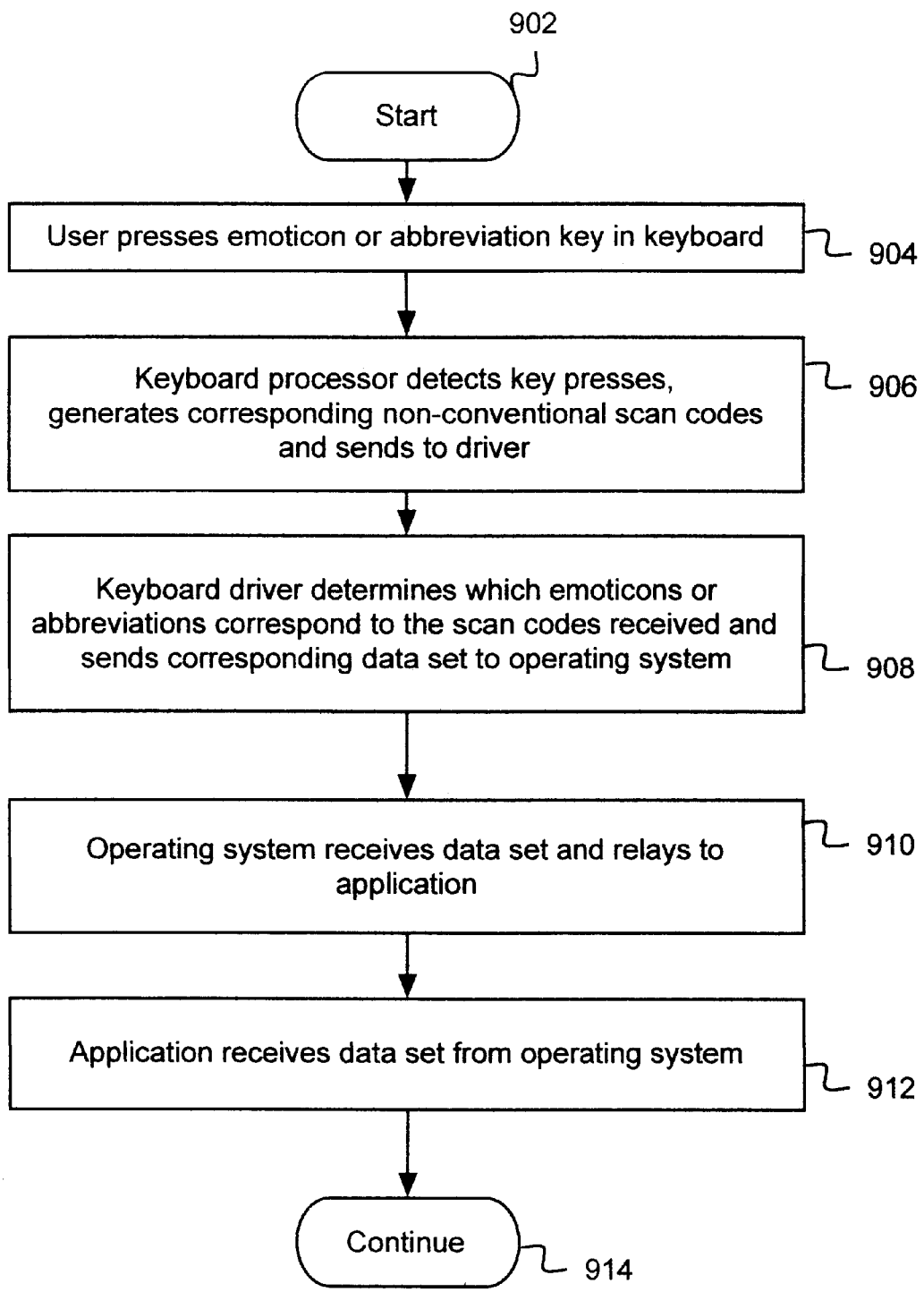
FIG. 9A is a flowchart depicting the operation and control flow of a second embodiment of the present invention.
Figure 9B:
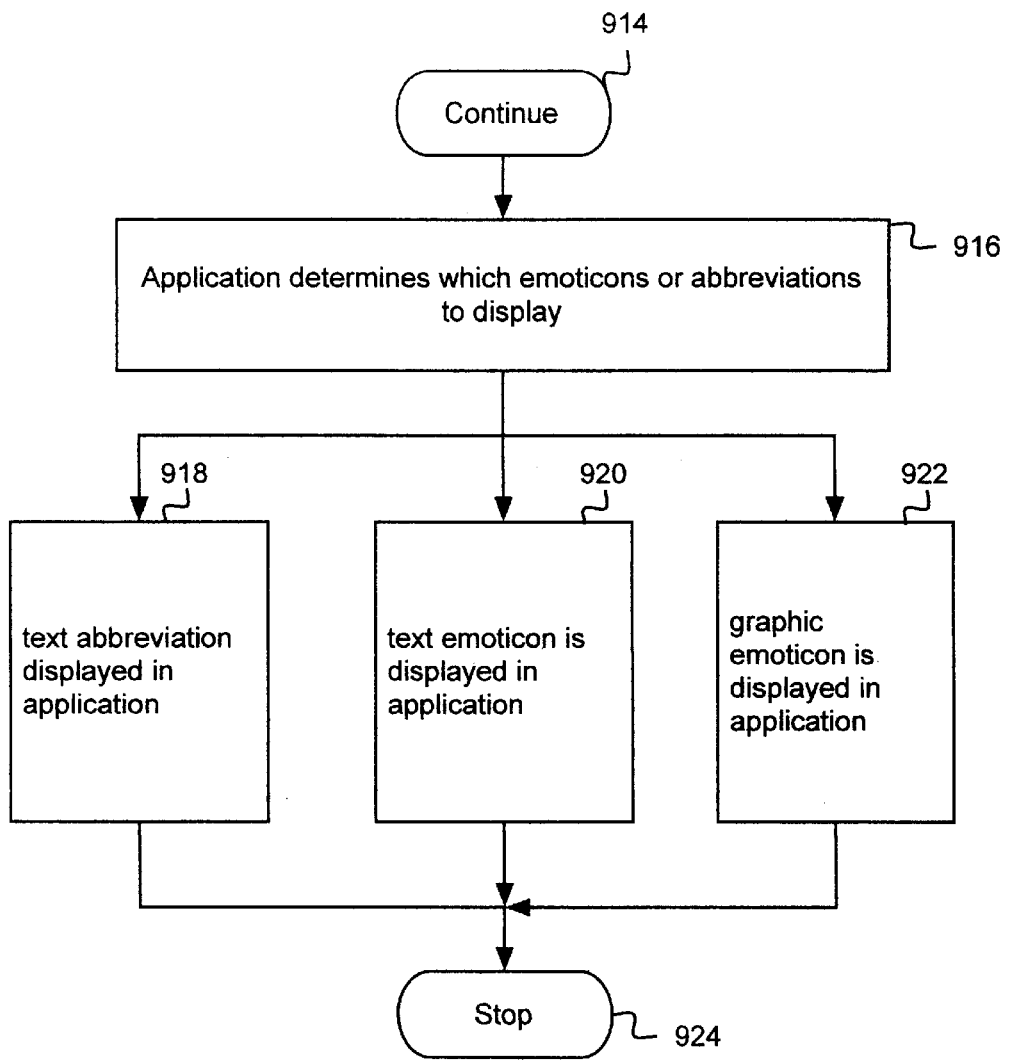
FIG. 9B is a continuation of the flowchart of FIG. 8A.

FIGS. 9A and 9B each show a flowchart depicting the operation and control flow of a second embodiment of the present invention. The control flow of FIGS. 9A and 9B begins with step 902 in FIG. 9A and flows directly to step 904. In step 904, a user 102 presses an emoticon or abbreviation key in keyboard 104 or keyboard attachment 106, producing a key press event 502. In step 906, the keyboard processor 504 captures the key press 502 and generates a corresponding scan code or scan codes 506. It should be noted that the scan code or scan codes 506 generated in step 906 comprise non-conventional, or new, scan codes representing an emoticon or abbreviation. In this embodiment, the non-conventional scan codes are supported by a keyboard driver 110 that is specially programmed to support such scan codes. Subsequently, the keyboard processor 504 sends the scan code or scan codes 506 to the keyboard driver 110 in the computer system 108 of user 102.

Next, in step 908, the keyboard driver 110 receives the scan code or scan codes 506 and uses a scan code table 512 to determine which emoticons or abbreviations correspond to the scan code or scan codes 506. Note that the keyboard driver 110 is specially programmed to support non-conventional scan codes. Subsequently, the keyboard driver 110 produces a data set representing the emoticons or abbreviations indicated by user 102. Then, the keyboard driver 110 sends the data set corresponding to the scan code or scan codes 506 to the operating system 112. In an embodiment of the present invention, the data set of step 908 comprises a set of numerical codes that directly identify an abbreviation, a text emoticon or a graphic emoticon.

In step 910, the operating system 112 receives the data set from keyboard driver 110 and determines whether the data set indicates an operating system command. Because the data set represents emoticons or abbreviations the operating system 112 determines that the data set does not indicate an operating system command, and relays the data set to the dominant application in the operating system 112, i.e., application 114. If the operating system 112 were to receive a conventional character set such as characters 508, the operating system would perform the process described in step 710 of FIG. 7.

In step 912, the application 114 receives the data set from the operating system 112. In step 914, the control flow of FIG. 9A flows directly to step 916 of FIG. 9B. In step 916, the application 114 interprets the data set and determines which information to display in response to the reception of the data set. Note that there is no character map used in step 916 as in step 816 of FIG. 8 above. This is because the data set received by application 114 comprises information that directly identifies an abbreviation, a text emoticon or a graphic emoticon. As such, there is no need for any lookup table to determine which abbreviation, text emoticon or graphic emoticon corresponds to the data in the data set.

In steps 918–922, the application 114 proceeds to display the information corresponding to the data set sent by operating system 112. Thus, application 114 displays a text abbreviation in the dominant display window in step 918, displays a text emoticon in the dominant display window in step 920 or displays a graphic emoticon in the dominant display window in step 922. In step 924, the control flow of FIGS. 9A and 9B ceases.

Figure 10:
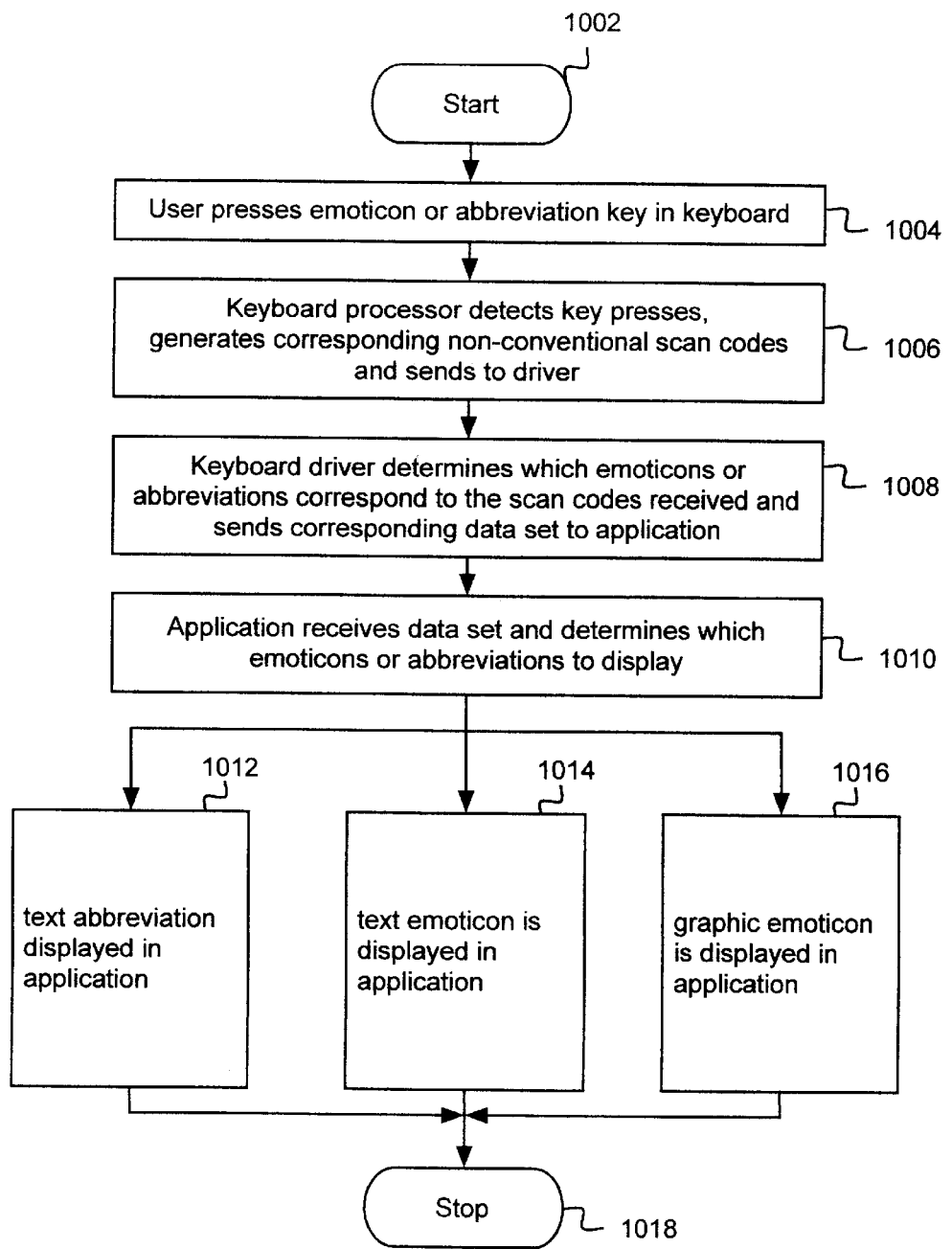
FIG. 10 is a flowchart depicting the operation and control flow of a third embodiment of the present invention.

FIG. 10 is a flowchart depicting the operation and control flow of a third embodiment of the present invention. The control flow of FIG. 10 assumes that application 114 and keyboard driver 110 are currently in a special mode whereby information from the keyboard 104 or keyboard attachment 106 is transmitted directly from the keyboard driver 110 to the application 114. As described in the conventional process of FIG. 7, typically information is passed from the keyboard driver 110 to the operating system 112, which determines whether the keyboard information indicates an operating system command before relaying the keyboard information to the application 114. This conventional process allows the operating system 112 to capture an operating system command that a user 102 may assert during execution of application 114. Specifically, this conventional process allows the operating system 112 to capture the use of pertinent keys such as the "Ctrl" key, the function keys shown in Table 5 above or the special keys shown in Table 6 above. The control flow of FIG. 10 assumes that application 114 and keyboard driver 110 are currently in a special mode whereby information from the keyboard 104 or keyboard attachment 106 circumvents the operating system 112.

The control flow of FIG. 10 begins with step 1002 and flows directly to step 1004. In step 1004, a user 102 presses an emoticon or abbreviation key in keyboard 104 or keyboard attachment 106, producing a key press event 502. In step 1006, the keyboard processor 504 captures the key press 502 and generates a corresponding scan code or scan codes 506. It should be noted that the scan code or scan codes 506 generated in step 1006 comprise non-conventional, or new, scan codes representing an emoticon or abbreviation. In this embodiment, the non-conventional scan codes are supported by a keyboard driver 110 that is specially programmed to support such scan codes. Subsequently, the keyboard processor 504 sends the scan code or scan codes 506 to the keyboard driver 110 in the computer system 108 of user 102.

Next, in step 1008, the keyboard driver 110 receives the scan code or scan codes 506 and uses a scan code table 512 to determine which emoticons or abbreviations correspond to the scan code or scan codes 506. Note that the keyboard driver 110 is specially programmed to support non-conventional scan codes. Subsequently, the keyboard driver 110 produces a data set representing the emoticons or abbreviations indicated by user 102. Then, the keyboard driver 110 sends the data set corresponding to the scan code or scan codes 506 to the, application 114.

In step 1010, the application 114 receives the data set and determines which information to display in response to the reception of the data set. In steps 1012–1016, the application 114 proceeds to display the information corresponding to the data set. Thus, application 114 displays a text abbreviation in the dominant display window in step 1012, displays a text emoticon in the dominant display window in step 1014 or displays a graphic emoticon in the dominant display window in step 1016. In step 1018, the control flow of FIG. 10 ceases.

Exemplary Implementations

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 11:
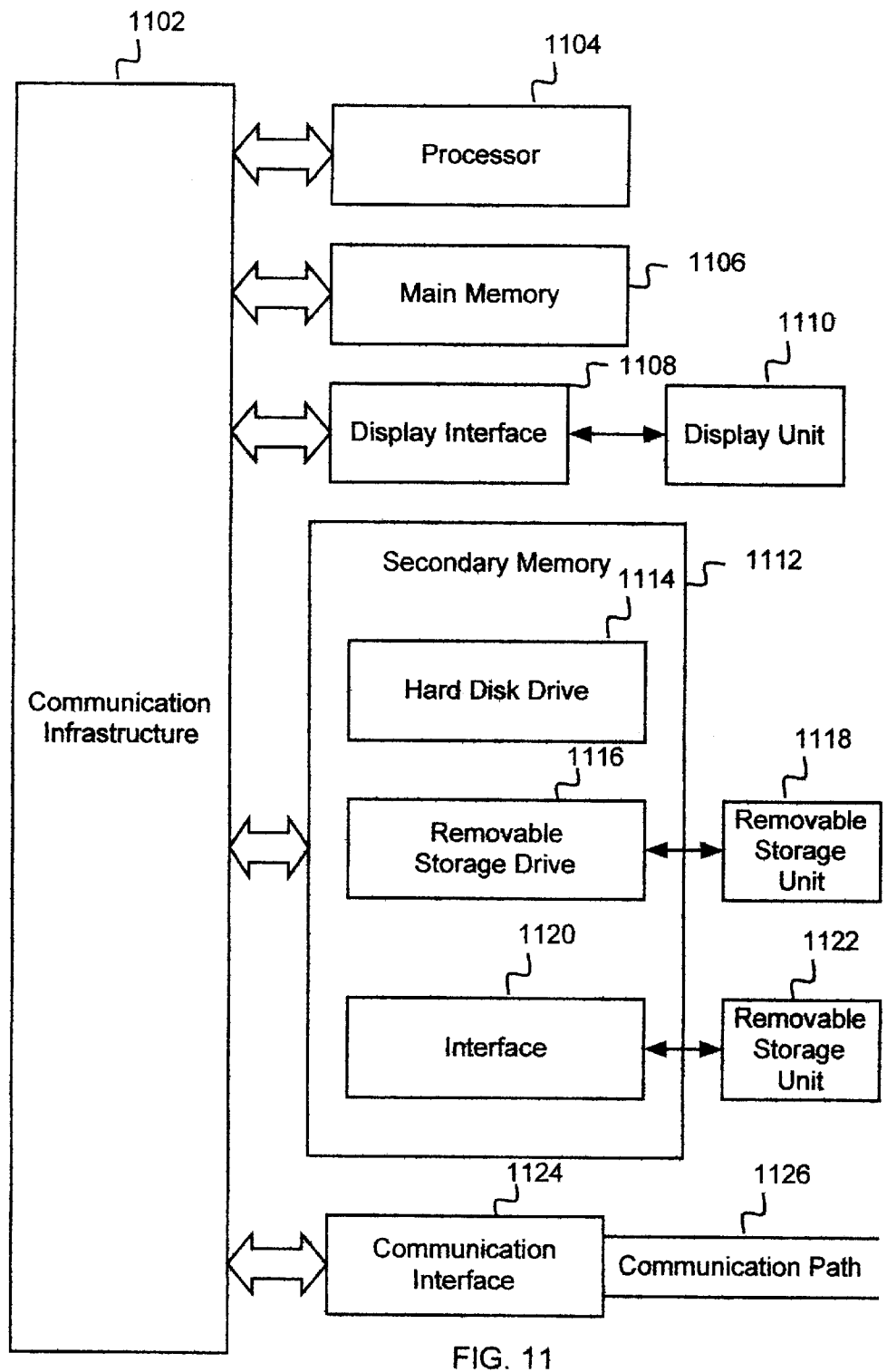
FIG. 11 is a block diagram of a computer system useful for implementing an embodiment of the present invention.

FIG. 11 is a block diagram of a computer system useful for implementing an embodiment of the present invention. The computer system includes one or more processors, such as processor 1104. The processor 1104 is connected to a communication infrastructure 1102 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 1108 that forwards graphics, text, and other data from the communication infrastructure 1102 (or from a frame buffer not shown) for display on the display unit 1110. The computer system also includes a main memory 1106, preferably random access memory (RAM), and may also include a secondary memory 1112. The secondary memory 1112 may include, for example, a hard disk drive 1114 and/or a removable storage drive 1116, representing a floppy disk drive, a magnetic tape drive, an optical disk drive, etc. The removable storage drive 1116 reads from and/or writes to a removable storage unit 1118 in a manner well known to those having ordinary skill in the art. Removable storage unit 1118, represents a floppy disk, magnetic tape, optical disk, etc. which is read by and written to by removable storage drive 1116. As will be appreciated, the removable storage unit 1118 includes a computer usable storage medium having stored therein computer software and/or data.

In alternative embodiments, the secondary memory 1112 may include other similar means for allowing computer programs or other instructions to be loaded into the computer system. Such means may include, for example, a removable storage unit 1122 and an interface 1120. Examples of such may include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to the computer system.

The computer system may also include a communications interface 1124. Communications interface 1124 allows software and data to be transferred between the computer system and external devices. Examples of communications interface 1124 may include a modem, a network interface (such as an Ethernet card), a communications port, a PCMCIA slot and card, etc. Software and data transferred via communications interface 1124 are in the form of signals which may be, for example, electronic, electromagnetic, optical, or other signals capable of being received by communications interface 1124. These signals are provided to communications interface 1124 via a communications path (i.e., channel) 1126. This channel 1126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 1106 and secondary memory 1112, removable storage drive 1116, a hard disk installed in hard disk drive 1114, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 1106 and/or secondary memory 1112. Computer programs may also be received via communications interface 1124. Such computer programs, when executed, enable the computer system to perform the features of the present invention as discussed herein. In particular, the computer programs, when executed, enable the processor 1104 to perform the features of the computer system. Accordingly, such computer programs represent controllers of the computer system.

Conclusion

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A keyboard system for interfacing with an information processing system, comprising:
   a keyboard including keys representing emoticons;
   a keyboard processor in the keyboard, wherein the keyboard processor produces an enhanced scan code when a key representing an emoticon is pressed in the keyboard;
   a keyboard driver on a computer system for interfacing with the keyboard, wherein the keyboard driver receives the enhanced scan code and determines at least one character that corresponds to the enhanced scan code; and
   an application on the computer system for interfacing with the keyboard driver, therein the application receives the at least one character determined by the keyboard driver and displays an image corresponding to the at least one character.

2. The keyboard system of claim 1, wherein the keyboard includes one or more of the following:
   a PS/2 connector;
   a USB connector; and
   a serial connector,
   and wherein the keyboard is coupled to the computer system.

3. The keyboard system of claim 1, wherein the enhanced scan code does not correspond to any scan codes of a standard 104-key Windows keyboard.

4. The keyboard system of claim 1, wherein the application comprises any one of the following:
   an instant messaging application;
   a word processing application; and
   an email application.

5. A keyboard system for interfacing with an information processing system, comprising:
   a keyboard including keys representing abbreviations;
   a keyboard processor in the keyboard, wherein the keyboard processor produces an enhanced scan code when a key representing an abbreviation is pressed in the keyboard;
   a keyboard driver on a computer system for interfacing with the keyboard, wherein he keyboard driver receives the enhanced scan code and determines at least one character that corresponds to the enhanced scan code; and
   an application on the computer system for interfacing with the keyboard driver, wherein the application receives the at least one character determined by the keyboard driver and displays an image corresponding to the at least one character.

6. The keyboard system of claim 5, wherein the keyboard includes one or more of the following:
   a PS/2 connector;
   a USB connector; and
   a serial connector,
   and wherein the keyboard is coupled to the computer system.

7. The keyboard system of claim 5, wherein the enhanced scan code does not correspond to any scan codes of a standard 104-key Windows keyboard.

8. The keyboard system of claim 5, wherein the application comprises any one of the following:
   an instant messaging application;
   a word processing application; and
   an email application.

9. A keyboard system for Interfacing with an information processing system, comprising:
   a keyboard attachment including keys representing emoticons;
   a keyboard processor in the keyboard attachment, wherein the keyboard processor produces an enhanced scan code when a key representing an emoticon is pressed in the keyboard attachment;

a keyboard driver on a computer system for interfacing with the keyboard attachment, wherein the keyboard driver receives the enhanced scan code and determines at least one character that corresponds to the enhanced scan code; and an application on the computer system for interfacing with the keyboard driver, wherein the application receives the at least one character by the keyboard driver and displays an image corresponding to the at least one character.

10. The keyboard system of claim 9, wherein the keyboard attachment includes one or more of the following:

a PS/2 connector;

a USB connector; and a serial connector, and wherein the keyboard attachment is coupled to the computer system.

11. The keyboard system of claim 9, wherein the enhanced scan code does not correspond to any scan codes of a standard 104-key Windows keyboard.

12. The keyboard system of claim 9, wherein the application comprises any one of the following:

an instant messaging application;

a word processing application; and an email application.

13. A keyboard system for interfacing with an information processing system, comprising:

a keyboard attachment including keys representing abbreviations;

a keyboard processor in the keyboard attachment, wherein the keyboard processor produces an enhanced scan code when a key representing an abbreviation is pressed in the keyboard attachment;

a keyboard driver on a computer system for interfacing with the keyboard attachment, wherein the keyboard driver receives the enhanced scan code and determines at least one character that corresponds to the enhanced scan code; and an application on the computer system for interfacing with the keyboard driver, wherein the application receives the at least one character determined by the keyboard driver and displays an image corresponding to the at least one character.

14. The keyboard system of claim 13, wherein the keyboard attachment includes one or more of the following:

a PS/2 connector;

a USB connector; and a serial connector, and wherein the keyboard attachment is coupled to the computer system.

15. The keyboard system of claim 13, wherein the enhanced scan code does not correspond to any scan codes of a standard 104-key Windows keyboard.

16. The keyboard system of claim 13, wherein the application comprises any one of the following:

an instant messaging application:

a word processing application; and an email application.

17. A method for interfacing a keyboard with an information Processing system, the method comprising:

determining, on a keyboard processor in a keyboard, which key representing an emoticon in the keyboard has been pressed;

producing, on the keyboard processor, an enhanced scan code corresponding to a key representing an emoticon in the keyboard, wherein the key representing an emoticon has been pressed;

receiving, by a keyboard driver on a computer system, the enhanced scan code;

determining, by the keyboard driver, at least one character that corresponds to the enhanced scan code;

receiving, by an application on the computer system, the at least one character determined by the keyboard driver; and displaying an image corresponding to the at least one character received.

18. The method of claim 17, wherein the keyboard includes one or more of the following:

a PS/2 connector;

a USB connector; and a serial connector, and wherein the keyboard is coupled to the computer system.

19. The method of claim 17, wherein the enhanced scan code does not correspond to any scan codes of a standard 104-key Windows keyboard.

20. The method of claim 17, wherein the application comprises any one of the following:

an instant messaging application;

a word processing application; and an email application.

21. A method for interfacing a keyboard attachment with an information processing system, the method comprising:

determining, on a keyboard processor in a keyboard attachment, which key representing an emoticon in the keyboard attachment has been pressed;

producing, on the keyboard processor, an enhanced scan code corresponding to a key representing an emoticon in the keyboard attachment, wherein the key representing an emoticon has been pressed;

receiving, by a keyboard driver on a computer system, the enhanced scan code;

determining, by the keyboard driver, at least one character that corresponds to the enhanced scan code;

receiving, by an application on the computer system, the at least one character determined by the keyboard driver; and displaying an image corresponding to the at least one character received.

22. The method of claim 21, wherein the keyboard attachment Includes one or more of the following:

a PS/2 connector;

a USB connector; and a serial connector, and wherein the keyboard attachment is coupled to the computer system.

23. The method of claim 21, wherein the enhanced scan code does not correspond to any scan codes of a standard 104-key Windows keyboard.

24. The method of claim 21, wherein the application comprises any one of the following:

an instant messaging application;

a word processing application; and an email application.

25. The keyboard system of claim 1, wherein the keyboard further comprises keys representing at least one of abbreviations and actions to execute, and wherein the application further determines if the at least one character corresponds to at least one of the image, an abbreviation and an action to execute, and wherein the application performs least one of displaying the image, displaying the abbreviation and executing the action based upon the character.

26. The keyboard system of claim 1, wherein the image is a graphical emoticon.

27. The keyboard system of claim 1, wherein the image is a text emoticon.

28. The keyboard system of claim 1, wherein the at least one character directly identifies the emoticon.

29. The keyboard system of claim 1, wherein the at least one character is examined to determine if the at least one character indicates an operating system command.

30. The keyboard system of claim 25, wherein the at least one character directly identifies at least one of the emoticon, the abbreviation and the action to execute.

31. The method of claim 1, wherein the enhanced scan code does not correspond to a character defined in the IBM PC Extended Character Set.

* * * * *